United States Patent [19]

Coon

[11] Patent Number: 4,658,090
[45] Date of Patent: Apr. 14, 1987

[54] RIBBON CABLE, A TRANSPOSED RIBBON CABLE, AND A METHOD AND APPARATUS FOR MANUFACTURING TRANSPOSED RIBBON CABLE

[75] Inventor: Jessie H. Coon, Ft. Wayne, Ind.

[73] Assignee: Phelps Dodge Industries, Inc., New York, N.Y.

[21] Appl. No.: 634,042

[22] Filed: Jul. 24, 1984

[51] Int. Cl.⁴ .............................................. H01B 7/30
[52] U.S. Cl. ................................. 174/119 R; 174/34; 174/72 TR; 174/117 FF
[58] Field of Search ................. 174/34, 72 A, 72 TR, 174/117 R, 117 F, 117 FF, 117 PC, 119 R, 119 C, 126 S, 128 S

[56] References Cited

U.S. PATENT DOCUMENTS

| | | | |
|---|---|---|---|
| 2,757,298 | 7/1956 | Botts et al. | 310/208 |
| 2,929,744 | 3/1960 | Mathes et al. | 174/119 R |
| 3,005,739 | 10/1961 | Lang et al. | 174/117 F |
| 3,526,544 | 9/1970 | Scala et al. | 174/117 FF |
| 3,528,852 | 9/1970 | Olson et al. | 174/117 FF |
| 3,634,808 | 1/1972 | Morrison | 174/117 FF X |
| 3,842,192 | 10/1974 | Hilker et al. | 174/120 SR |
| 4,210,773 | 7/1980 | Haley et al. | 174/72 A |
| 4,370,548 | 1/1983 | Nagasawa et al. | 219/345 X |
| 4,391,848 | 7/1983 | Hilker | 427/118 |
| 4,430,139 | 2/1984 | Baverstock | 174/117 F X |
| 4,431,860 | 2/1984 | Perco et al. | 174/34 |
| 4,439,256 | 3/1984 | Meserve | 174/34 X |
| 4,486,253 | 12/1984 | Gonia | 174/117 F X |

FOREIGN PATENT DOCUMENTS

| | | | |
|---|---|---|---|
| 515052 | 12/1930 | Fed. Rep. of Germany | 174/72 TR |
| 121985 | 9/1979 | Japan | 174/119 R |
| 382329 | 10/1932 | United Kingdom | 174/72 TR |
| 651950 | 4/1951 | United Kingdom | 174/34 |

Primary Examiner—Arthur T. Grimley
Assistant Examiner—Morris H. Nimmo
Attorney, Agent, or Firm—Lundy and Walker

[57] ABSTRACT

Improved method and apparatus for manufacturing transposed ribbon cable, an improved ribbon cable, and an improved transposed ribbon cable. The transposed ribbon cable is manufactured by the method and apparatus of the invention by folding a ribbon cable angularly with respect to the longitudinal axis repeatedly while advancing the ribbon cable incrementally.

15 Claims, 13 Drawing Figures

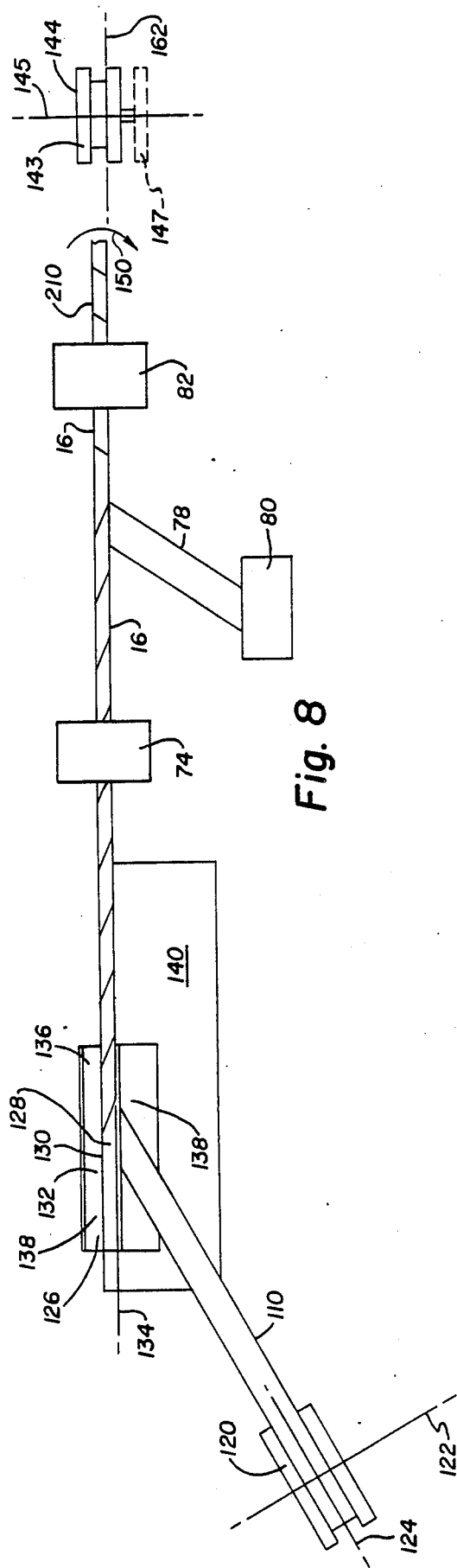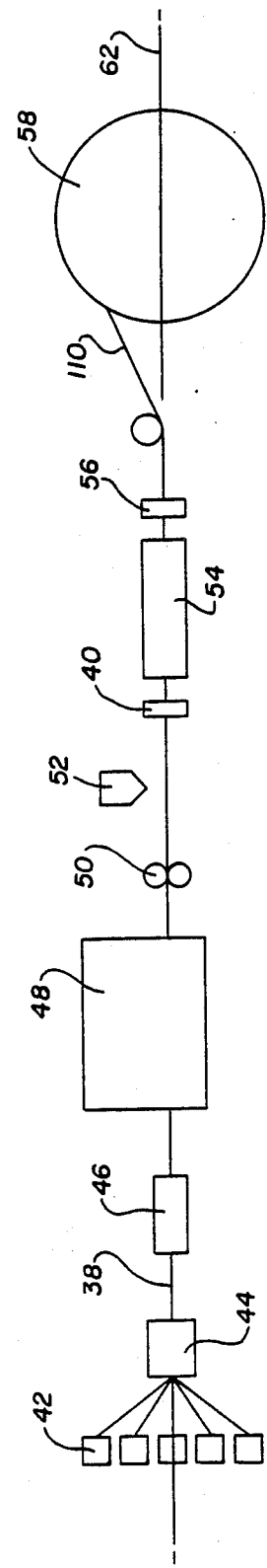

RIBBON CABLE, A TRANSPOSED RIBBON CABLE, AND A METHOD AND APPARATUS FOR MANUFACTURING TRANSPOSED RIBBON CABLE

BACKGROUND OF THE INVENTION

The present invention relates to electrical cable and particularly to ribbon cables in which insulated conductors are positioned, in a fixed relationship to each other, and more particularly, to transposed ribbon cables and methods and apparatus for manufacturing the same.

Electrical cables in a variety of configurations have been available for an extended period of time. One of those varieties is ribbon cable. A ribbon cable has a roughly rectangular cross section as opposed to the round cross section of ordinary cables. The rectangular cross section permits use of the ribbon cable and applications where one or two dimensions are constrained.

Ribbon cables also provide improved field or armature and stator windings in a number of electrical magnetic devices such as motors and generators and transformers. Ribbon cables in many applications provide for increased ease of assembly and improved efficiency. In some electromagnetic devices, eddy current losses can be reduced drastically by use of transposed ribbon cable. In other electromagnetic devices these eddy current losses can be balanced against other losses to produce an electromagnetic device having a greatly improved efficiency.

In transformer design, greater energy efficiency is achieved by using ribbon cable. Load losses can be reduced by using transposed ribbon cable. Similar benefits and similar energy efficiencies can be achieved in rotating electromagnetic device design using ribbon cables and transposed ribbon cables.

Further, transposed cables heretofore have been limited as to the number of conductors in the cable. This limitation is the result of conventional methods and apparatus for manufacturing transposed cable. No such limitation exists for the methods and apparatus of the invention.

It is therefore, however, desirable to provide an improved method and apparatus for manufacturing transposed ribbon cable in which the insulated conductors are in a fixed relation to each other and are at an angle to the longest dimension of the cable.

SUMMARY OF THE INVENTION

It is an object of this invention to provide an improved ribbon cable and an improved transposed ribbon cable.

It is also an object of the invention to provide a ribbon cable having a single conductor and an improved transposed ribbon cable made therefrom.

It is also an object of the invention to provide an improved method and apparatus for manufacturing transposed ribbon cables.

Another object of the invention is to provide an improved method and apparatus for manufacturing transposed ribbon cables in which the insulated conductors are in fixed relation to each other.

Another object of the invention is to provide an improved method and apparatus for manufacturing transposed ribbon cables in which insulated conductors are in a fixed relation and disposed at an angle to the longitudinal dimension of the cable.

Yet another object of the invention is to provide an improved method and apparatus for manufacturing transposed ribbon cable in which there is no limitation as to the number of conductors in the cable.

A further object of the invention is to provide an improved method and apparatus for manufacturing transposed ribbon cable from a ribbon cable having a plurality of longitudinally extending, insulated conductors in fixed relation to each other by folding the same repeatedly while advancing the ribbon cable incrementally.

Finally, it is an object of the invention to provide an improved apparatus and method for manufacturing transposed ribbon cable which meets all of the above desired features.

In the broader aspects of the invention, there is provided an improved method and apparatus for manufacturing transposed ribbon cable, an improved ribbon cable, and an improved transposed ribbon cable. The transposed ribbon cable is manufactured by the method and apparatus of the invention by folding a ribbon cable angularly with respect to the longitudinal axis repeatedly while advancing the ribbon cable incrementally.

BRIEF DESCRIPTION OF THE DRAWINGS

The above mentioned and other features and objects of this invention and the manner of obtaining them will become more apparent and the invention itself will be better understood by reference to the following description of an embodiment of the invention taken in conjunction with the accompanying drawing wherein:

FIG. 7 is a schematic diagram of the apparatus for the production of the ribbon cable of FIG. 1.

FIG. 8 is a schematic diagram of the apparatus of the invention for the production of transposed ribbon cables of FIGS. 2 and 3.

DESCRIPTION OF A SPECIFIC EMBODIMENT

Figure 3:
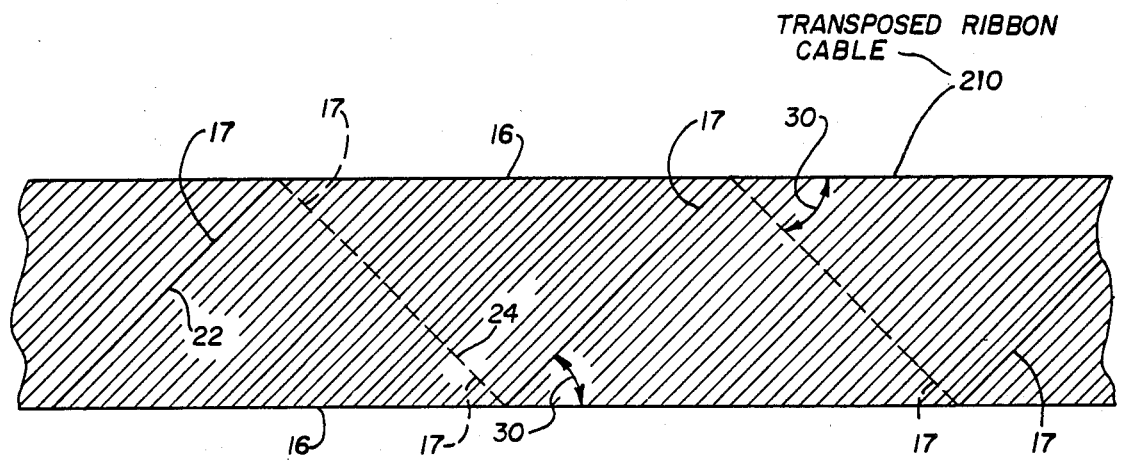
FIG. 3 is a top plan view of the transposed ribbon cable shown in FIG. 2.
Figure 2:
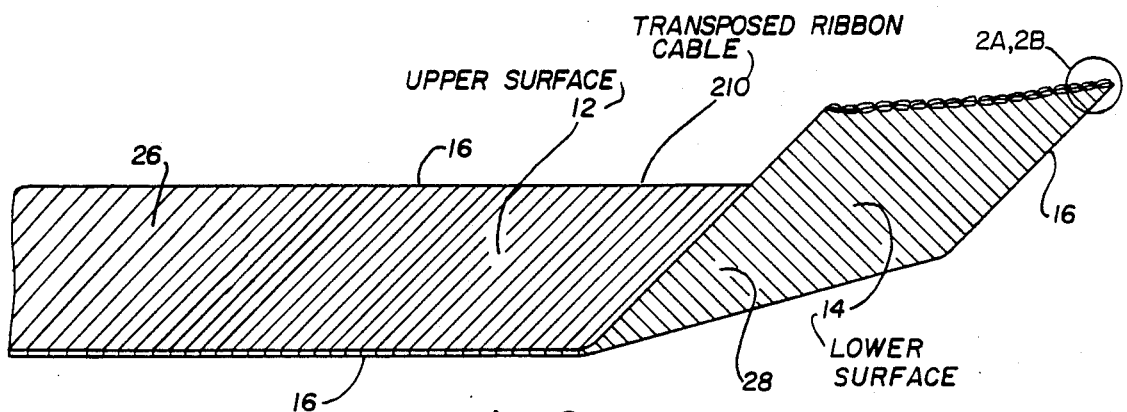
FIG. 2 is a perspective view of the transposed ribbon cable manufactured by the method and apparatus of the invention from the ribbon cable of FIG. 1, including an enlarged view of the end of the transposed ribbon cable of the invention. In the enlarged view, the circularity of component cross-sections is exaggerated for clarity.

The transposed ribbon cable 210 manufactured by the apparatus and method of the invention comprises a plurality of conductors 18, each having upper segments 22 and lower segments 24 which are co-planar with each other and at an oblique angle to the longest dimension of the cable 210 as shown in FIGS. 2 and 3.

Each of the conductors 18 are shown to have superimposed thereon a flexible, continuous and concentric coat of insulating material 19 and are held in fixed relationship to each other by a bonding material 20. In a specific embodiment, bonding material 20 has sufficient insulating properties for the application, and functions as the base insulation for conductors 18.

Ribbon cable 210 has a generally rectangular cross section with an upper surface 12, lower surface 14 and two edges 16. Upper surface 12 and lower surface 14 are generally parallel and roughly planar to each other with deviations from that shape generally due to the cross sectional shape of the conductors 18. In specific embodiments, rectangular cross section conductors 18 are used and the planarity of the surface 12 and 14 is better than that shown in FIG. 2.

In all embodiments, the upper and lower segments 22, 24 of each conductor 18 are sequentially transposed throughout the length of the cable 210. This relationship may be described mathematically by the following formulas in which "a" equals the acute angle 30 between the upper and lower segments 22, 24 of the helices and the longest dimension of the transposed ribbon cable 210, "N" equals the number of conductors 18 in the transposed ribbon cable 110, "d" equals the nominal outside diameter of conductors 18, "W" equals the cable width of the transposed ribbon cable 210 perpendicular to its longest dimension, "p" equals the pitch of the transposed ribbon cable 210, i.e. the distance between successive upper segments 22 or lower segments 24 of the conductor 18 in a direction parallel to the longest dimension of the transposed ribbon cable 210. "CL" equals the length of the transposed ribbon cable 210, and "SL" equals the strand length or the length of the conductor 18 in a transposed ribbon cable 210 or length "CL":

$$\text{CABLE WIDTH} = \frac{N \ (Nom. \ OD)}{2 \ \text{Sin} \ (90 - a)}$$

$$\text{STRAND WIDTH} = \frac{L}{\text{Sin} \ (90 - a)}$$

$$\text{FOLDING ANGLE} = \frac{-1 \ N \ (Nom. \ OD)}{2W}$$

$$\text{PITCH} = (\text{advance of cable per machine revolution}) = \frac{W}{\text{Sin} \ a}$$

Angle 30 in all embodiments ranges from slightly greater than 0 to slightly less than 90 degrees.

In the transposed ribbon cable 210 manufactured by the method and apparatus of the invention, the upper and lower segments 22, 24 define upper and lower layers 26 and 28, respectively. Upper layer 26 and the lower layer 28 are bonded together by bonding material 32. In a specific embodiment, bonding material 32 may be the same as bonding material 20. Conductors 18 in the upper segments 22 and lower segments 24 of the transposed ribbon cable 210 are angularly disposed to the longest dimension of the cable 210 and at an adjacent angle to the segments of the opposite layer 22 or 24.

In a specific embodiment of the transposed ribbon cable 210 of the invention as shown in FIGS. 2 and 3, 600 conductors 18 of 0.020 inch bare copper are used, each conductor has superimposed thereon a polyvinyl formal enamel coating and is bonded to adjacent conductors 18 with a polyvinyl butyral enamel. The 300 upper segments 22 together with their bonding material 20 form the upper layer 26 and the 300 lower segments 24 together with their bonding material 20 form the lower layer 28. Layers 26 and 28 are bonded together with their bonding material 32.

In other embodiments, conductors 18 may number several thousand. An unlimited number of conductors 18 may be positioned in one or more ribbons of generally co-planar conductors 18 and used in the manufacture of transposed ribbon cable 210.

Figure 1:
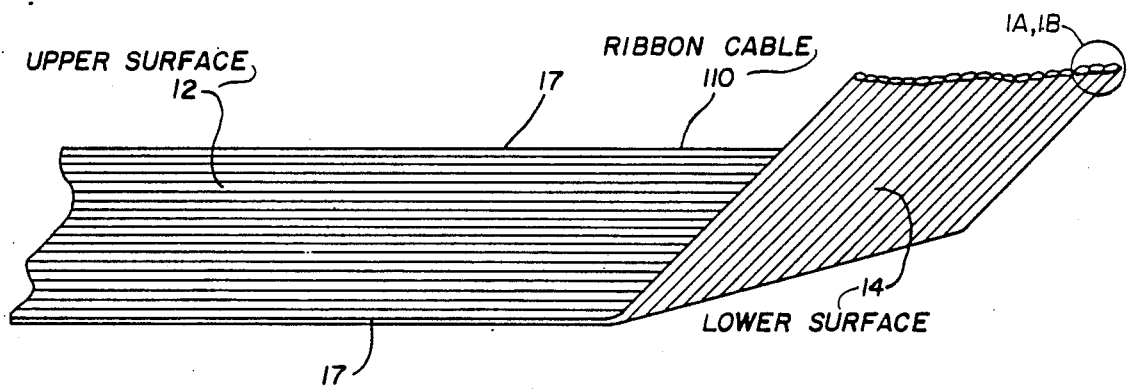
FIG. 1 is a perspective view of a ribbon cable from which transposed ribbon cable can be made in accordance with the method and apparatus of the invention, including an enlarged view of the end of the ribbon cable of the invention. In the enlarged view, the circularity of component cross-sections is exaggerated for clarity.
Figure 1A:
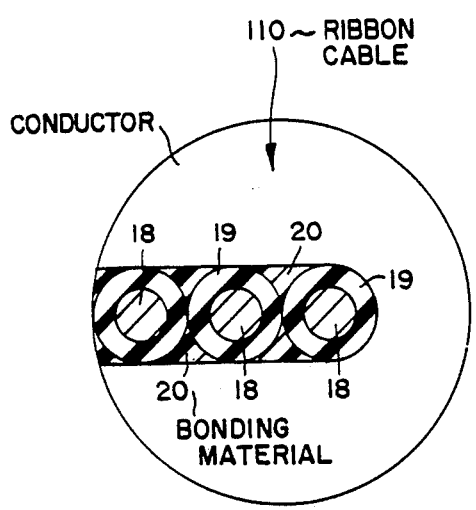
FIG. 1A is a cross-sectional view of an embodiment of the ribbon cable of FIG. 1.
Figure 1B:
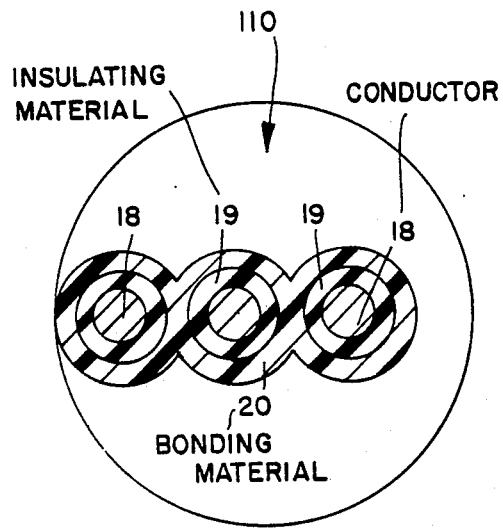
FIG. 1B is a cross-sectional view of another embodiment of the ribbon cable of FIG. 1.
Figure 2A:
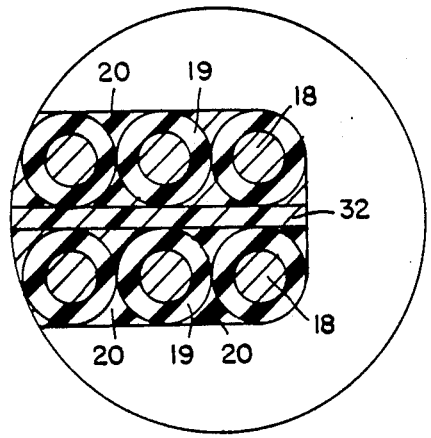
FIG. 2A is a cross-sectional view of an embodiment of the transposed ribbon cable of FIG. 2.
Figure 2B:
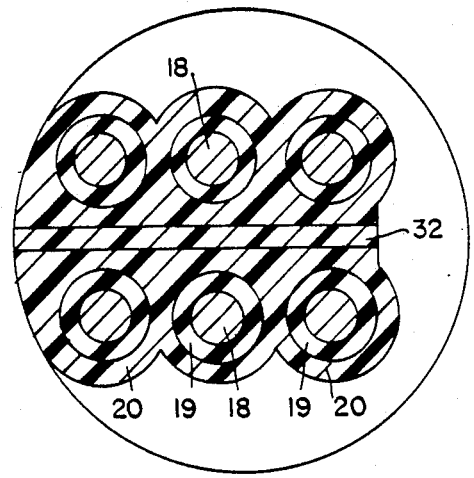
FIG. 2B is a cross-sectional view of another embodiment of the transposed ribbon cable of FIG. 2.
Figure 4:
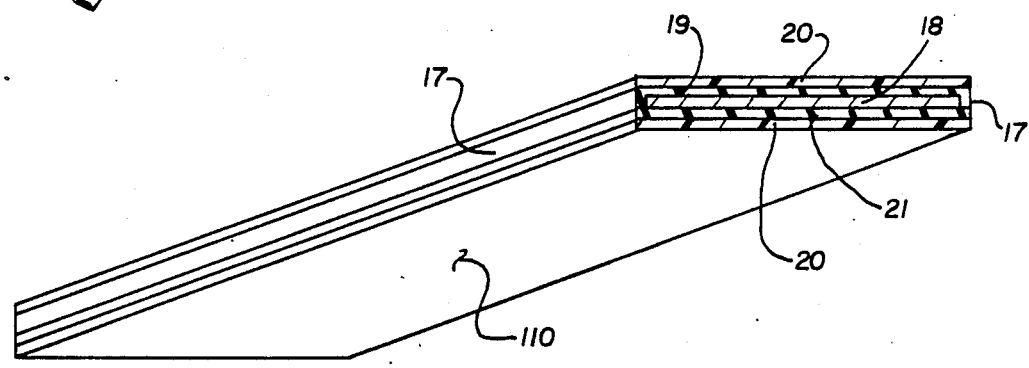
FIG. 4 is a prospective view of another ribbon cable from which transposed ribbon cable can be made in accordance with the method and apparatus of the invention.
Figure 5:
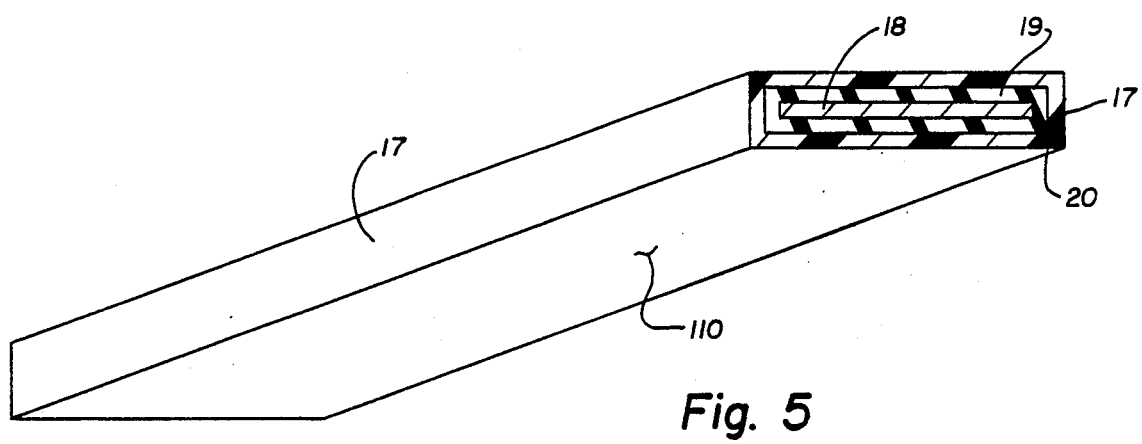
FIG. 5 is a perspective view of another ribbon cable from which transposed ribbon cable can be made in accordance with the method and apparatus of the invention.

In accordance with the method and apparatus of the invention, transposed ribbon cable 210 is made from ribbon cable 110 as shown in FIGS. 1, 4 or 5 or as disclosed in U.S. patent application Ser. No. 634,040 filed on July 24, 1984. Ribbon cable 110 as shown in FIG. 1 is manufactured by insulating one or more conductors 18 using conventional magnet wire wrapping or enamel solution coating methods or methods generally disclosed in U.S. Pat. No. 4,391,848 or U.S. Pat. No. 3,842,192, paying out as many insulated conductors 18 as are required, simultaneously, and guiding the conductors into the form of a ribbon 38 wherein the longitudinal axis of each conductor is parallel to the axes of the others and define a single plane and the exterior surfaces of the conductors are contiguous to adjacent conductors.

Conductors 18 are then bonded together to form the cable 110. The bonding step can be performed by utilizing a B-stage bonding material superimposed on the insulated conductors 18 subsequently to the insulating step and then performing the bonding step by activating the bonding material during the bonding step. Alternatively, bonding material may be applied to the contiguous and parallel conductors of the ribbon 38 during the bonding step and after the performance of the guiding step.

Preferably, care should be taken to impregnate or fill all the interstices between the conductors 18. This can be achieved by utilizing modified vacuum impregnation techniques or pressurized bonding techniques, if desired.

The bonding step continues by wiping the excess of the bonding material from the ribbon and hardening the bonding material so as to form cable 110. During the wiping and hardening steps, the respective conductors 18 are maintained in the same position as aforedescribed in the guiding step and the upper surface 12, the lower surface 14 and the two edges 17 are formed.

In a specific embodiment, such as the embodiment illustrated in FIG. 1, conductors 18 may be insulated and formed together as ribbon cable 110 and bonded with a bonding material applied to the conductors.

In another ribbon cable illustrated in FIG. 5, ribbon cable 110 comprises a single conductor 18 having superimposed thereon a flexible, continuous and concentric coat of insulation material 19. Insulation material 19 can be applied using conventional magnet wire wrapping or enamel solution coating methods or methods generally disclosed in U.S. Pat. No. 4,391,848 or U.S. Pat. No. 3,842,192. Conductor 18 is elongated and of generally rectangular cross-sectional shape. Conductor 18 extends essentially the full length and width of the cable 110. If desired, a continuous and concentric coat of a flexible bonding composition may be superimposed on insulation material 19.

In an alternate construction shown in FIG. 4, conductor 18 is conductive foil bonded to a ribbon 21 of flexible insulation material or conductive paint or other depositions or metal or conductive material on a ribbon 21 of flexible insulation material with a continuous and uniform thick coat 19 of flexible insulation material superimposed thereon forming a sandwich with the foil or conductive material in the middle. In specific embodiments, ribbon 21 can be of any insulating sheet material. Those existing at this time include Kapton, Nomex, and Mylar material sold by E. I DuPont de Nemours & Company.

A conductor 18 may also be bonded to a ribbon 21 of flexible insulation material by a continuous and uniform thick layer of bonding material 20 positioned between the conductor 18 and the ribbon material. If desired, a continuous and uniformally thick coat 20 of bonding material may be placed on the ribbon and/or on the coat 19 of insulation material, as desired.

In specific embodiments, the insulation of coats 19 and bonding material of coats 20 and 32 can be of any magnet wire insulating material or bonding material, respectively. See for example those materials in ANSI/NEMA MW1000-1977 Standards. In specific embodiments, the insulation material and the bonding material of coats 19, 20 and 32 can be the same material.

In still another embodiment (not shown), ribbon cable 110 comprises a plurality of conductors 18 which are spaced apart and bonded to a ribbon of insulating material. This ribbon cable from which the transposed ribbon cable can be manufactured by the apparatus and method of this invention is disclosed in a contemporaneously filed patent application entitled "Ribbon Cable" by John C. Kauffman also assigned to Phelps Dodge Industries, Inc. The disclosure of this patent application is incorporated herein by reference.

In some of the embodiments of the invention, the conductors 18 are magnet wire and the insulation material 19 superimposed on each conductor 18 is in accordance with ANSI/NEMA MW1000-1977 Standards, except in some of the cable configurations of the invention, less build and lower dielectric values than required by the ANSI/MENA MW1000-1977 Standards are acceptable. The lower limits of build and dielectric value are determined by the anticipated turn to turn voltage differentials of the specific contemplated application.

In manufacturing transposed ribbon cable 210, the ribbon cable 110 disclosed herein or the ribbon cable of the patent application (all hereinafter referred to by numeral 110) is folded over itself, repeatedly, to produce a transposed ribbon cable. The folding of the cable 110 to form the transposed cable 210 as shown in FIGS. 2, 3 and 5 forms each of the conductors of the cable into upper segments 22 and lower segments 24 and appex and lower layers 26, 28. Each fold positions the conductors 18 of the folded portion angularly with respect to the conductors of the preceding portion and with the longitudinal axis of the finished cable 210.

Cable 210 is shown consisting of a continuous length of ribbon 110 folded at folds 23 so as to position the longitudinal boundaries 17 of ribbon 110 contiguous with each other and result in a folded ribbon cable having longitudinal boundaries 16 defined by the fold 23 and layers 26, 28 of conductors 18 extending angularly to the longitudinal axis of the folded ribbon cable 210. The angle at which the conductors are disposed to the longitudinal axis of the folded ribbon cable can be any angle between 0° and 90° as above mentioned.

Figure 6:
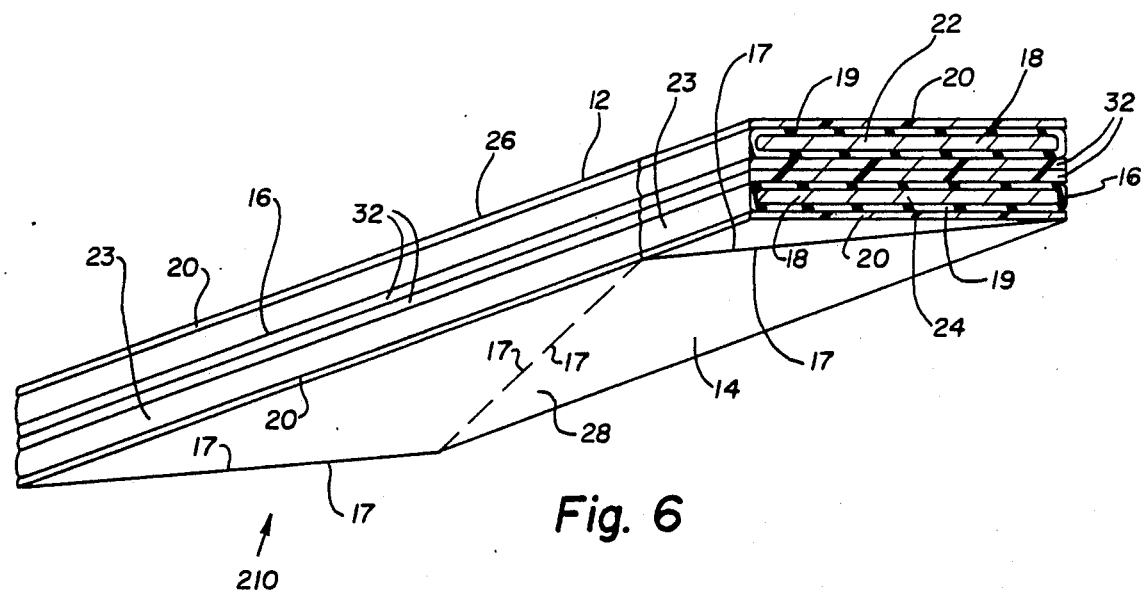
FIG. 6 is a perspective view of the transposed ribbon cable of the invention manufactured by the method and apparatus of the invention from the ribbon cable of FIG. 5.

The folding of the cable 110 to form the transposed cable 210 as shown in FIGS. 2, 3 and 6 forms each of the conductors into a folded cable having upper segments 22 and lower segments 24. The folding of the ribbon cable 110 repeatedly in the same direction forms the conductors of the cable into laterally flattened helices. On the other hand, the folding of the ribbon cable 110 alternatively in opposite directions forms the conductors into a plurality of superimposed folds. Both folding configurations are covered by the inventions disclosed herein.

The folding of the cable 210 to form laterally flattened helices comprises the steps of paying out the ribbon 110 at an angle to the desired axis of the transposed ribbon cable 210 a measured amount, folding the ribbon cable 110 against a first straight edge, and rotating the folded cable 210 in the direction of the fold. Paying out cable 110 a second measured amount to move the fold so as to position the straight edge coincident with the opposite longitudinal boundary of the cable 210 and the cable 110 is folded and rotated in the same direction, again. Cable 110 is repeatedly paid out and folded in this manner.

The folding of the cable 210 to form superimposed folds comprises the steps of paying out the ribbon 110 at an angle to the desired axis of the transposed ribbon cable 210 a measured amount, folding the ribbon 110 against a first straight edge in a first direction, so as to form a first longitudinal boundary of the ribbon cable 210, rotating the ribbon cable 110 in the direction of the fold, paying out the ribbon cable 110 a second measured amount, folding the ribbon cable 110 against a second straight edge in a second direction opposite to the first direction to define the opposite longitudinal boundary of the cable 210, and rotating the ribbon cable 110 in the direction of the fold. Cable 110 is repeatedly payed out and folded alternatively in opposite directions in this manner.

Simultaneously with the folding steps, bonding material 32 may be positioned between the folded portions. Subsequently thereto, the folded portions may be compressed and bonded together to form an bonded transposed ribbon cable 210. Again the bonding step, in specific embodiments, may include the aforementioned application of solvent or heat, or the use of vacuum or pressure impregnating techniques or B-stage bonding materials. The transposed ribbon cable formed by this method is then severed at opposite ends to expose a plurality of conductor ends, maybe wrapped with exterior insulation material, either spirally or longitudinally, and spooled for shipment.

As the ribbon cable 110 is folded repeatedly to form the transposed cable 210 into a laterally flattened helix, as above described, the axis of the transposed cable 210 is repeatedly moved, and the cable 110 is successively paid out an amount equal to the distance between a position corresponding to one edge 16 of the cable 210 and a position corresponding to the opposite edge 16 of the cable 210. The two positions of the axis of the cable 210 are parallel to each other and spaced apart a distance equal to the cable width.

This motion of the longitudinal axis of the cable 210 and the repeated folding requires the take-up spool to move with the axis a distance equal to the cable width and either the take-up spool or the pay-out spool to rotate with each fold of the cable 110 when forming laterally flattened helices. When not forming laterally flattened helices, the spools may need to rotate only a partial revolution or sufficient slack in the ribbon cable 110 may alleviate the necessity of spool movement.

The resulting cable is an integral cable with the conductors bonded together with the bonding material surrounding each conductor and defining with the conductors the boundaries of the cable. The ribbon cable 210 can be wrapped with exterior insulation material either spirally or longitudinally and spooled for shipping as desired.

Figure 9:
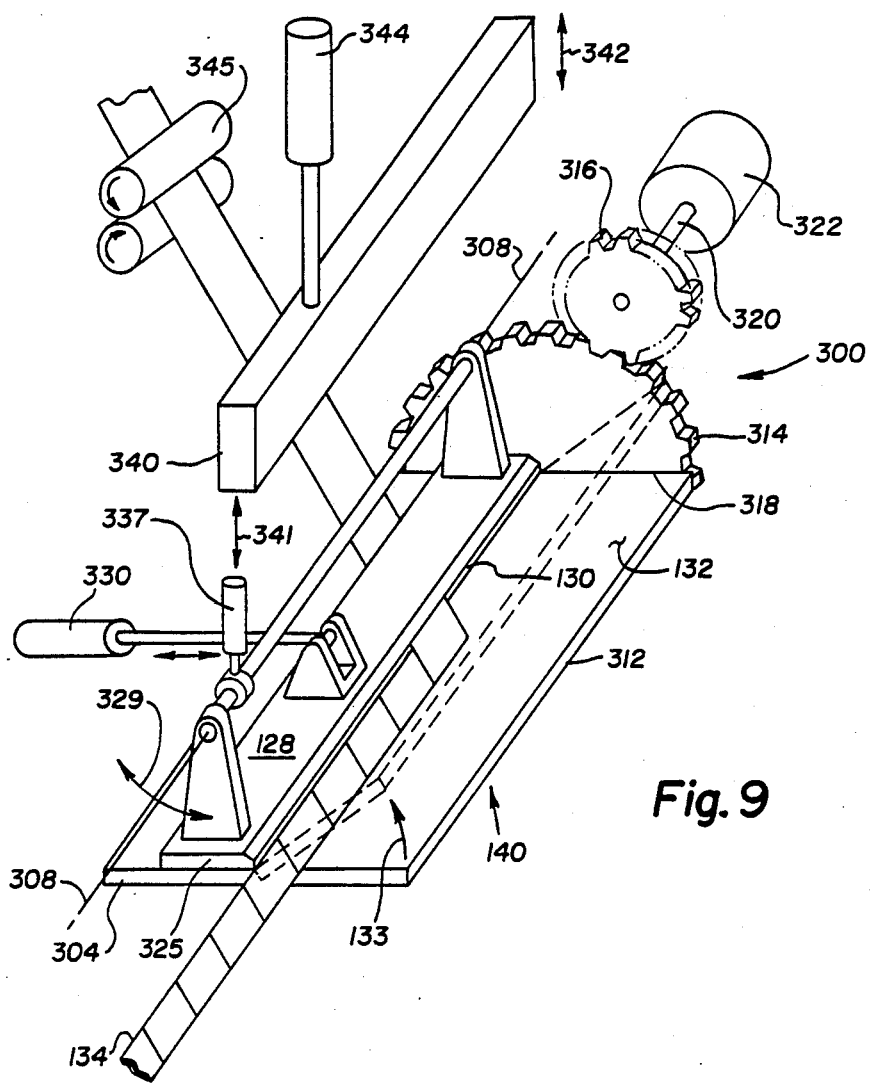
FIG. 9 is a schematic perspective view of the folder of the invention illustrated in FIG. 7.

The apparatus of the invention is illustrated in FIGS. 7 through 9. In making the cable 110 illustrated in FIG. 1, the conductors are first insulated as above described, and may be spooled for handling. B-stage bonding materials may be superimposed on the insulated conductors if desired in accordance with the afore-described insulating methods. Referring to FIG. 7, conductors 18 are transported then from conductors supplies or spools 42 or directly through a guide 44 to form the conductors into a ribbon 38 of parallel coplanar wires. Suitable bonding material 20 is applied to the ribbon 38 by the applicator 46. The applicator 46 may take several forms in different embodiments. The applicator 46 in all embodiments must hold conductors 18 in the form of ribbon 38 throughout the bonding step and until the bonding material is hardened and the ribbon 38 is bonded together as in a single piece.

In a specific embodiment, the applicator 46 may be a heated die in which the die opening is geometrically similar and only slightly different from the desired cross sectional dimensions of the cable 110. In accordance with conventional extrusion technology, the die opening may be either larger or smaller than the desired dimensions of the cable 110.

In another specific embodiment, the applicator 46 may be a heated channel also having a channel opening with a cross sectional shape geometrically similar but slightly larger than the desired dimensions of the cable 110. In this embodiment, the channel merely holds the ribbon 38 of parallel co-planar wires in the shape desired and forms the exterior dimensions of the cable 110 when the bonding material hardens.

In other specific embodiments, the parallel co-planar conductors 18 may be held in the form of ribbon 38 by oppositely disposed side portions of guide 44 and the opposite edges 16 of the ribbon 110 are formed by the continual wiping of the ribbon on the oppositely disposed side portions, and the upper surface 12 and the lower surface 14 are formed by knives or wipers which continually wipe the excess bonding material from the ribbon 38.

Still referring to FIG. 7, bonding material 20 is activated by passing the ribbon 38 through an oven 48, or alternatively by exposing the bonding material 20 to a solvent therefore. The solvent bonded ribbon may be air dried or oven dried. The bonding material is softened into a flowable form in both embodiments. Oven 48 softens the bonding material 20 in the former case, and drives off the solvent in the latter case. Heat may also be used to assist a solvent in softening bonding material 20. In all cases, oven 48 may additionally cure either the insulation or bonding material, or both.

The bonded ribbon cable 110 is than transported through pressure rollers 50. In the specific embodiment illustrated, additional bonding material 20 is applied to the ribbon cable 110 by means of applicator 52 and ribbon cable 110 is transported through a heated die 40 and a quenching unit 54. Thus two specific embodiments of the apparatus of applying bonding material 20 to the ribbon 38 are shown. In other specific embodiments, only one of the specific embodiments or a combination of the two different embodiments may be used. The excess bonding material is removed by wiper 56.

The finished longitudinal ribbon cable 110 is either wound onto a take-up reel 58 which also provides the motive power for transportation or is input directly into the remaining portion of the apparatus by which the transposed ribbon cable 210 of the invention is manufactured. Presently, in the manufacture of cable 210, it is contemplated that the manufacturing of the cable 110 and the manufacture of the cable 210 and the winding of a field or armature winding may all be done successively without utilizing the take up reels or spools, in tandem. Both the drawing and insulation of the conductors by the conventional wrapping or solution coating methods or by the methods disclosed in U.S. Pat. No. 3,842,192 and U.S. Pat. No. 4,391,848 allow tandem operation if desired. This remaining portion of the apparatus of the invention for the production of transposed ribbon cable 210 is illustrated in FIGS. 8 and 9.

FIG. 8 schematically illustrates the apparatus used to manufacture transposed ribbon cable 210 of the invention from the ribbon cable 110 by repeatedly folding the ribbon cable 110 over itself to form both the cable 110 and its respective conductors 18 into a plurality of laterally flattened helices or multiple superimposed folds having the afore-described upper and lower segments 22 and 24. As schematically shown, a supply of cable 110 is placed on a spool 120 which is mounted for rotation about an axis 122. Cable 110 is paid out from the spool 120 onto folding table 140 so as to define a longitudinal axis 124. Folding table 140 comprises a folder 126 having a folding member 128 with a straight folding edge 130. A folding portion 132 of table 140 is pivoted to rotate about an axis 134. The angle between the axis 124 and the folding edge 130 determines the relationship between the pitch and the width of the cable 210. Axis 134 is parallel to folding edge 130 of member 128 and positioned in the folding surface 136 of portion 132. The folding portion 132 rotates about the axis 134 so as to overlay the folding surface 138 of portion 132 and table 140 one on the other. All of the motion of the folding portion 132 is relative to folding table 140 which supports the cable 110 during the folding operation and can be achieved by a conventional machine elements.

In operation, the ribbon cable 110 of the invention is fed along the axis 124 so as to extend beyond folding edge 130 of folder 126. Folding member 128 is positioned to overlay cable 110 and folding portion 132 is actuated to move in the direction of arrow 133 about axis 134 so as to fold cable 110 over folding edge 130. This folding defines one edge 16 of the transposed ribbon cable 210.

By further advancing ribbon cable 110 in the direction of axis 124, the cable 110 is again folded at folder 126. Similarly, folding member 128 is positioned over ribbon cable 110 and folding portion 132 is actuated to move about axis 134 so as to fold ribbon cable 110 over itself and to position folding surface 138 in an overlaying position on folding member 128 with the folded portions of the ribbon cable therebetween. This folding defines the opposite edge 16 of the cable 210 forms each conductor into laterally flattened helices.

After each fold, folding station 126 is opened and the ribbon cables 110 and 210 are advanced by take-up spool 144, the rollers 74, 82 and advancer 345, so as to position the opposite edge 16 of the cable 210 in alignment with folding edge 130 of the folding station 126, and a fold at the folding station 126 is again performed. Rollers 74 and 82 are only engaged to cable 210 when folding is not occurring. Otherwise, both rollers 74 and 82 are spaced from cable 210 sufficiently to allow cable 210 to rotate about axis 134 as indicated by arrow 150. Ribbon cables 110 and 210 are then again advanced along axes 124 and 134 and a fold is repeated. By repeatedly advancing the ribbon cable 110 and the repetitive folding of cable 110 at folding station 126, transverse cable 210 is produced.

Referring to FIG. 9, folder 126 has a stationary portion 304 and a movable portion 132, both with an upwardly facing generally planar folding surface 138. The movable portion 132 is hingedly movable about an axis 134 located in the folding surface 138 from a first position 312 shown in solid lines in which the folding surface 138 of the movable portion 132 forms a continuation of said folding surface 138 of the stationary portion 304 to a second position 313 in which the movable portion 132 overlays the stationary portion 304 as indicated by the arrow 133. Movable portion 132 is forcibly moved between its first and second positions by means of a gear 314 driven by a pinion gear 316. Gear 314 is secured to movable portion 132 at 318. Pinion gear 316 is secured to the shaft 320 of motor 322. The opposite end of folder 126 is open.

A folder 128 is positioned above folding table 140 and has a straight folding edge 130. Folder 128 is movable up and down a small distance (no more than twice the thickness of cable 210) by power cylinder 337 as indicated by arrow 341, and movable by a power cylinder 330 about an axis 308 from a position 325 in which the folder is superimposed on the folding surface 138 of the stationary portion 304 with the folding edge 130 and the axis 134 defining a common plane to a position remote therefrom as indicated by the arrow 329.

A press 340 is provided to press the fold initially made by the folder 128. Press 340 is movable from a position in which the press is also superimposed on the folding surface 138 of the stationary portion 304 adjacent to axis 134 to a position remote therefrom as indicated by the arrow 342. Press 340 is movable by a power cylinder 344. Both press 340 and folder 128 are positioned on stationary portion 304 in the same position when in their superimposed positions, respectively.

Ribbon cable 110 is advanced by ribbon cable advancer 345 angularly of folding edge 130 and overlaid folding surface 138. Ribbon cable advancer 345 is synchronized with rollers 74 and 82 so as to advance ribbon 110 and folded ribbon cable 210 correspondingly at the same time. Folder 128 is moved into its position 325 with folding edge 130 and axis 134 forming a common plane and with ribbon cable 110 positioned between surface 138 and folder 128. Folder 128 then is moved by cylinder 327 to clamp ribbon 110 between folder 128 and surface 138. Movable table portion 132 is then moved from its first position 312 by actuating motor 322 into its second and overlaying position 313 to fold the ribbon cable about folding edge 130. Once the fold is accomplished, folder 128 is both moved upward by cylinder 327 and into its remote position by cylinder 330; movable portion 132 is moved into its first position 312 in which its folding surface 138 forms a continuation of the folding surface 138 of the stationary portion 304; and press 340 is moved by power cylinder 344 into its overlaying position so as to press the fold just made. Press 340 is then moved into its remote position and ribbon cable 110 and folded ribbon cable 210 are advanced.

Still referring to FIGS. 8 and 9, similarly, the ribbon cable 110 of the invention may be folded so as to define a plurality of superimposed folds by the apparatus illustrated. In this operation, the ribbon cable 110 of the invention is fed along axis 124 so as to extend beyond folding edge 130 of folder 126 and folder 126 is operated to fold the ribbon cable 110 as above described. A second folder 126 (not shown) is positioned subsequent (between folder 126 and rollers 74) to the folder 126 shown in FIG. 8 so as to produce a fold in the opposite direction shown in FIG. 8. Both folders function as described hereinabove so as to position a folded portion over an unfolded portion of the ribbon cable 110. The second folder 126 has the identical structure as described herein with regard to the folder 126 but is provided in its mirror image so as to have its open end facing in the same direction. The folding of the ribbon cable by the two folders 126, however, does not require the folded transposed ribbon cable 210 to rotate fully around axis 134. In a specific embodiment contemplated by the invention, the rotation of spool 144 is not required at all, but sufficient slack in the ribbon cable 210 between spool 144 and folder rollers 82 alleviates the need for movement of the spool 144.

The finished folded ribbon cable 210 of the invention can then be wrapped with insulating material 78 delivered by material supply 80 is desired. The wrapping shown is spiral wrapping. Longitudinal wrapping is disclosed in U.S. Pat. No. 3,842,192 may be preferred in some applications. Pressure rollers 82 secure the insulating material. Finished transposed folded cable is transported onto a take-up spool 144 for shipping, storage, or otherwise handling.

Generally, no additional bonding material need be applied to adhere the wrapped insulating material 78 to the cable 210. Generally, the wrapping of insulating material 78 occurs while the bonding material is still activated and the bonding material adheres the wrapping 78 to the conductor 210. However, additional activation may be supplied by applying heat or solvent, as desired, prior to the rollers 82.

Referring again to FIG. 8, a take-up spool 144 is provided to either spool the product for shipment or handling or storage. Spool 144 is mounted for rotation about an axis 145 in all embodiments and is mounted for movement along axis 145 between a first position 143 shown in solid lines in FIG. 8 and another position 147 shown in dashed lines in FIG. 8 and for rotation about axis 134 and 162 in the embodiments above-described in which cable 110 is formed into a plurality of laterally flattened helices.

The movement of spool 144 is coordinated with the folding of the ribbon 110 about edge 130 of folder 126. Thus, whenever ribbon 110 is in folder 126, the cable 210 is in position 143 as shown in solid lines in FIG. 8. In folder 126, the ribbon is folded and the spool 144 is rotated about axis 162 as indicated by arrow 150 into its position 147. Upon the advancement of ribbon cable 110 into folding station 126, the ribbon cable 210 is moved from position 147 as shown in dashed lines in FIG. 8 back to position 143 as shown in solid lines in FIG. 8. The motion of the spool 144 is then repeated, as the repeated folding of cable 110 is performed.

In another specific embodiment in which the folding of cable 210 forms the conductors into laterally flattened helices, the spool 144 is mounted for rotation about axis 145 in a single position, and spool 120, folding table 140 and folder 126 is rotated about cable axis 162 upon each fold being made.

Still referring to FIG. 8, in another embodiment in which a field or armature winding is manufactured in tandem with the ribbon cable 110 and folded ribbon cable 210 of the invention, take up spool 144 is replaced by a coil winding apparatus suitable for shaping an armature, a transformer core, or field of an electromagnetic device. In this embodiment, the coil winding apparatus is mounted for rotation about axis 162 and movement along axis 145 between the first position 143 shown in solid lines in FIG. 8 and another position 147 shown in dash lines, and rotated about axes 134 and 162, like take up spool 144 when the folding results in laterally flattened helices. On the other hand, when the folding results in a plurality of superimposed folds, take up spool 144 and/or the coil winding apparatus, as the case may be, need not be mounted for movement along axis 145, but can be positioned in position 143 and mounted so as to rotate about axis 145, as afore-mentioned.

While a specific embodiment of the invention has been shown and described herein for purposes of illustration, it is desired that the protection afforded by any patent which may issue upon this application not be limited strictly to the disclosed embodiment; but that it extend to all structures and arrangements and methods and articles which contain the essence of the invention and which fall within the scope of the claims which are appended herein.

What is claimed is:

1. A ribbon cable comprising an elongated conductor, said conductor having width and thickness dimensions, said conductor extending essentially the entire length, width and thickness of the ribbon cable, said conductor having superimposed thereon a continuous and uniformly thick coat of flexible insulation material, said conductor being folded into a transposed ribbon cable wherein said conductor axes are angularly disposed to the longitudinal axis of said transposed ribbon cable, said conductor being folded at the boundaries of said transposed ribbon cable, said transposed ribbon cable having two layers of said conductor, said conductor defining a laterally flattened helix.

2. A ribbon cable comprising an elongated conductor, said conductor having width and thickness dimensions, said conductor extending essentially the entire length, width and thickness of the ribbon cable, said conductor having superimposed thereon a continuous and uniformly thick coat of flexible insulation material, said conductor being folded into a transposed ribbon cable wherein said conductor axes are angularly disposed to the longitudinal axis of said transposed ribbon cable, said conductor being folded at the boundaries of said transposed ribbon cable, said transposed ribbon cable having two layers of said conductor, said conductor defining a plurality of superimposed folds.

3. The cable of claim 1 further comprising a continuous and uniformly thick coat of a flexible bonding material superimposed on said coat of insulation material.

4. The cable of claim 2 further comprising a continuous and uniformly thick coat of flexible bonding material superimposed on said coat of insulation material.

5. The cable of claims 3, or 4 wherein said bonding material is softenable by the application of heat.

6. The cable of claims 3, or 4 wherein said bonding material is softenable by the application of solvent.

7. The cable of claims 3, or 4 wherein said insulating material is the same material as said bonding material.

8. The cable of claim 1 wherein said conductor is chosen from the group consisting of metallic foils, metallic paints and metallic and other depositions of conductive material, said coat of insulation material comprises a flexible ribbon of insulation material on which said conductor is superimposed and a continuous and uniformly thick coat of flexible insulation material superimposed on said ribbon cable with said conductor between said ribbon and said coat of flexible insulation material.

9. The cable of claim 2 wherein said conductor is chosen from the group consisting of metallic foils, metallic paints and metallic and other depositions of conductive material, said coat of insulation material comprises a flexible ribbon of insulation material on which said conductor is superimposed and a continuous and uniformly thick coat of flexible insulation material superimposed on said ribbon cable with said conductor between said ribbon and said coat of flexible insulation material.

10. The cable of claims 8 or 9 further comprising a coat of flexible bonding material superimposed on said ribbon between said conductor and said ribbon.

11. The cable of claims 8 or 9 further comprising a continuous and uniform coat of flexible bonding material superimposed on said ribbon, said ribbon being between said conductor and said coat of bonding material.

12. The cable of claim 1 wherein said conductor is chosen from the group consisting of aluminum and copper conductors, conductive foils and strips, conductive paint, and depositions of conductive material.

13. The cable of claim 2 wherein said conductor is chosen from the group consisting of aluminum and copper conductors, conductive foils and strips, conductive paint, and depositions of conductive material.

14. The transposed ribbon cable of claims 1 or 2 wherein said conductor layers are bonded together.

15. The transposed ribbon cable of claims 1 or 2 wherein said conductor has upper segments and lower segments, said upper segments being oblique to said longitudinal axis and at adjacent angles to said lower segments of said conductor, and said lower segments of said conductor are oblique to said longitudinal axis and at adjacent angles to said upper segments of said conductor.

* * * * *